US008682753B2

(12) United States Patent
Kulathungam

(10) Patent No.: US 8,682,753 B2
(45) Date of Patent: Mar. 25, 2014

(54) SYSTEM AND METHOD TO CONSOLIDATE AND UPDATE A USER'S FINANCIAL ACCOUNT INFORMATION

(76) Inventor: Murali S. Kulathungam, Herndon, VA (US)

( * ) Notice: Subject to any disclaimer, the term of this patent is extended or adjusted under 35 U.S.C. 154(b) by 0 days.

(21) Appl. No.: 13/429,341

(22) Filed: Mar. 24, 2012

(65) Prior Publication Data

US 2013/0254079 A1    Sep. 26, 2013

(51) Int. Cl.
*G06Q 40/00* (2012.01)
(52) U.S. Cl.
USPC ........... 705/30; 705/36 R; 705/37; 705/14.27; 705/76; 705/52; 709/219
(58) Field of Classification Search
USPC ................ 705/30, 14.27, 76, 37, 52; 709/219
See application file for complete search history.

(56) References Cited

U.S. PATENT DOCUMENTS

| | | | |
|---|---|---|---|
| 6,269,369 B1 | 7/2001 | Robertson | |
| 7,017,109 B1 | 3/2006 | Douvikas et al. | |
| 7,149,419 B2 | 12/2006 | Akada | |
| 7,505,974 B2 | 3/2009 | Gropper | |
| 7,620,404 B2 | 11/2009 | Chesnais et al. | |
| 7,620,996 B2 | 11/2009 | Torres et al. | |
| 7,685,052 B2 * | 3/2010 | Waelbroeck et al. | 705/37 |
| 7,693,752 B2 | 4/2010 | Jaramillo | |
| 7,818,382 B2 | 10/2010 | Sommerer | |
| 7,894,809 B2 | 2/2011 | Munje | |
| 2004/0243503 A1 * | 12/2004 | Eng et al. | 705/37 |
| 2008/0177745 A1 | 7/2008 | Eldering et al. | |
| 2009/0307060 A1 * | 12/2009 | Merz et al. | 705/10 |
| 2010/0145861 A1 * | 6/2010 | Law et al. | 705/76 |
| 2010/0250411 A1 * | 9/2010 | Ogrodski | 705/30 |
| 2010/0304725 A1 | 12/2010 | Gueron et al. | |
| 2011/0004551 A1 * | 1/2011 | Armes et al. | 705/44 |
| 2012/0078732 A1 * | 3/2012 | Heller | 705/14.73 |

FOREIGN PATENT DOCUMENTS

| | | |
|---|---|---|
| EP | 1379974 | 10/2002 |
| EP | 1574013 | 7/2004 |
| EP | 1594338 | 9/2005 |

* cited by examiner

*Primary Examiner* — Vanel Frenel
(74) *Attorney, Agent, or Firm* — Drew Alia

(57) ABSTRACT

Computer software, systems and methods preventing automatic deductions/credits to a User's financial account from being interrupted when a User changes the account. A User inputs information for one or more of their financial accounts into a record stored on a server database that is accessible from the User's electronic communications device. When the User changes information within the System database for one of their financial accounts, the System will automatically or periodically perform updates of the information on a Third Party database; or the Third Party server will request the updated information, wherein the Third Party is authorized to electronically debit or credit the account. Therefore, the User is not required to individually contact each Third Party with their updated account information, such as for monthly membership deductions, direct deposit of paychecks and retirement account contributions, and stored credit cards for online shopping.

18 Claims, 5 Drawing Sheets

SYSTEM AND METHOD TO CONSOLIDATE AND UPDATE A USER'S FINANCIAL ACCOUNT INFORMATION

FIELD OF THE INVENTION

The present invention relates generally to computer software applications, systems and methods for consolidating and managing financial accounts, and automatically forwarding updated account information to relevant third parties or making updated account information available to relevant third parties.

BACKGROUND

Individuals today on average possess multiple financial accounts, such as bank accounts, credit card accounts, and retirement plan accounts. Each account has its own identification information (i.e. account number, routing number) that is required by a Third Party to access the individual's account, whether they are crediting or deducting from the account. When an individual changes any one of their financial accounts, such as switching their bank account to another institution, they must notify all third parties who had access to that account of the new information in order to ensure that their affiliation with the Third Party is kept active. It is a laborious task to notify each Third Party and enter the new financial institution's name, address, routing number, account number, etc. There is also the possibility that the individual will overlook notifying a Third Party, especially if they have only an occasional transaction with them (i.e. yearly membership fees). The repercussions to the individual can be serious if a Third Party is unable to make a deduction from an account that has been closed, or a payment (i.e. paycheck) is not appropriately credited to the User's account.

Therefore, there is a need for an online product or service which enables a User to consolidate all of their different types of financial accounts into one database. This will enable the User to easily update their account with a Third Party who has automatic debiting or crediting of any one of their financial accounts.

SUMMARY

The present invention comprises methods, systems, and computer program products for consolidating a User's financial accounts into a central database. A consolidated file enables a User to easily update a financial account within their file, and to automatically provide the update to a Third Party, such as an employer with direct deposit or a merchant with automatic monthly debiting. The Third Party database comprises Users' financial account information that the Users have granted the Third Party permission to bill or credit, such as for services or products provided by the Third Party to the User. Types of financial accounts comprise one or more bank accounts, credit card accounts, debit card accounts, retirement accounts, investment accounts, PayPal® accounts, similar financial accounts and any combination thereof.

The System can permit Third Parties access to the updates on the System to download or import them into their database (i.e. FIG. 4); and/or the Third Party can permit the System access to their database to push the updates (i.e. FIG. 5). When the Third Party accesses the System, the System will identify all User accounts on the System database that the Third Party needs data from; and/or which User accounts have had data changes since the last System request by the Third Party. The Third Party will then download the Users' information to their database. The downloaded data may consist of all data available to the Third Party or only a specific subset of the data as requested by the Third Party. Similarly, on a periodic basis or as an update is made by a System User, the System identifies which Third Parties require the User(s) update, then accesses and pushes the update(s) to the Third Parties' database.

In one preferred embodiment of the present invention (i.e. FIG. 4), a Third Party (i.e. bank) is granted access to a User(s) file on the system. Steps to the computer implemented method comprise: a) creating a User account on a system by inputting a User's name, login and password, and User's contact information; b) inputting and saving financial account information for one or more of a User's financial accounts; c) Users entering and updating Third Party access permissions for each of a User's financial account(s) stored on the System database d) updating and saving by the User a change in information for a financial account stored on the System database; e) connecting to the System by a Third Party; f) identifying by the System all User accounts that the Third Party needs information from; g) identifying by the System which User accounts have had data changes since the Third Party's last system request; h) granting by the System to the Third Party the financial account information for the identified Users; and, i) downloading said information by the Third Party.

In another preferred embodiment of the present invention (i.e. FIG. 5), the Third Party grants access to the System to push the Users' updates to the Third Party's database. The steps to the computer-implemented method comprise: a) creating a User account on the System database by inputting name, login and password, and User's contact information; b) inputting and saving into the User's System account the User's financial account information for one or more of a User's financial accounts; c) Users entering and updating Third Party access permissions for each of a User's financial account(s) stored on the System database; d) updating and saving by the User a change in information for one or more financial accounts stored on the System database; e) identifying by the System which Third Parties the User has granted permission to the User's updated financial account data; and, f) connecting by the System to the Third Parties' system and providing the update(s) to the Third Parties' database.

One aspect of the present invention comprises a User manually entering information pertaining to their various financial accounts into a computer file. This can be done online either on a personal computer or other internet-enabled device connected to a website, or on a mobile communications device with web browser abilities wherein the User could create and update their account offline. Their account of the System database would automatically be updated when web service resumed. When the User enters a financial account, they also designate the Third Parties that should have access to that particular account.

Another aspect of the present invention comprises enabling a Third Party to have access from a System database that stores the consolidated User's financial accounts, for the purpose of receiving updates from the System for the User's file that is applicable to the Third Party.

Another aspect of the present invention comprises enabling a System to access a Third Party database for the purpose of downloading updates to System User's financial account information.

Another aspect of the present invention is the granting of permission levels to Third Parties who access the System. While a User may have granted permission to a Third Party to bill a particular account, the User's file on the System database will list all of their financial accounts debiting information. Therefore for security reasons, the User will have to designate privilege levels to Third Parties that grant them access to a particular account or accounts within their file, but not to their entire System file. This can be done when the User enters the financial account information into their System file or at any time thereafter.

Another aspect of the invention comprises the System providing means for a Third Party to add associated data to a User's system account, but not to edit any of the data that was not added by that Third Party. For example, a Third Party merchant, such as Amazon, may want to add a User's Amazon account number to the User's system account to more easily reference User data.

Another aspect of the invention comprises the System recording all System, User, and Third Party activities on the System database for accounting and security reasons. Activities may comprise, for example, dates and times of Users' access their System account, and any updates that they make; and the dates and times Third Parties access the System, data they add to User's files, and the specific downloads they make from the System.

In a preferred embodiment of the present invention (i.e. FIG. 4), the System will conduct its own scan for Users' updates on its System database, and it will provide to the Third Party only account information updates that it has identified as applicable to the Third Party. When the Third Party connects to the System, it can ask for all of the User data that it has permission to receive as designated by the User, or it can ask for any updated data since the last request. The Third Party could also request data for a list of specific Users. That list would be compared against the System database to ensure that the Third Party had access to that information prior to making it available for download.

Likewise, when a User makes an update to one of their financial accounts on the System database, the System will immediately or periodically access the Third Party database, and make the update of the User's account (i.e. FIG. 5). It is noted, though, that this method requires the Third Party to grant permission to the System to access their Users' files (i.e. customer debiting records). The Third Party may set privilege levels that permit the System to access only designated Users files—those common to both the System and the Third Party—and not their entire database of Users. Alternatively, the System merely downloads and/or imports the Users' updates into the Third Party database, and the Third Party system accesses and incorporates the updates into the appropriate Users' accounts.

BRIEF DESCRIPTION OF THE DRAWINGS

The methods, systems, and computer programs that embody the above and other inventive features will now be described with reference to the following drawings.

DETAILED DESCRIPTION

Figure 1:
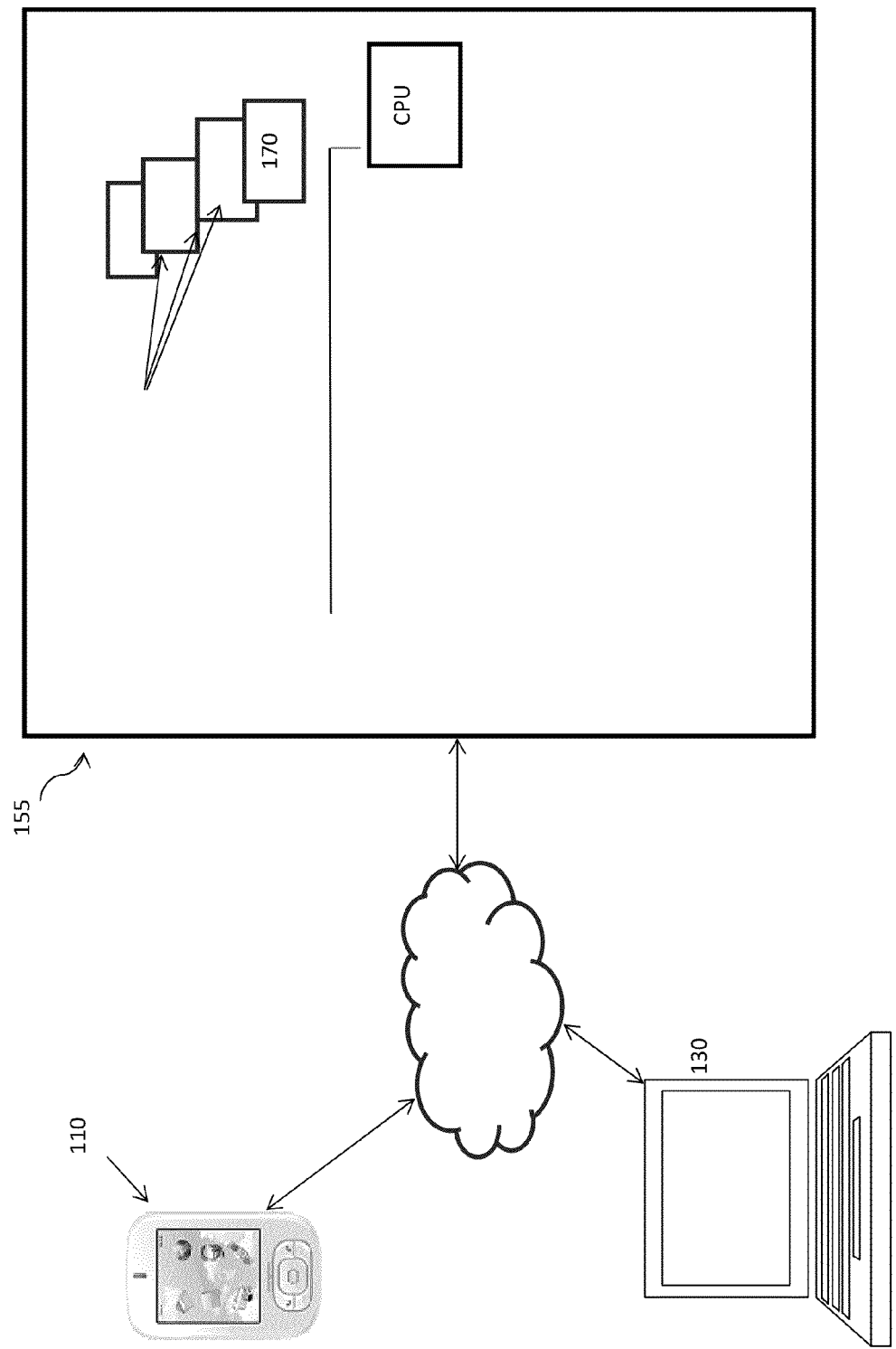
FIG. 1 is a detailed block diagram showing a configuration of the system server components in communication with Users' mobile device and laptop computer in a preferred embodiment of the present invention.
Figure 2:
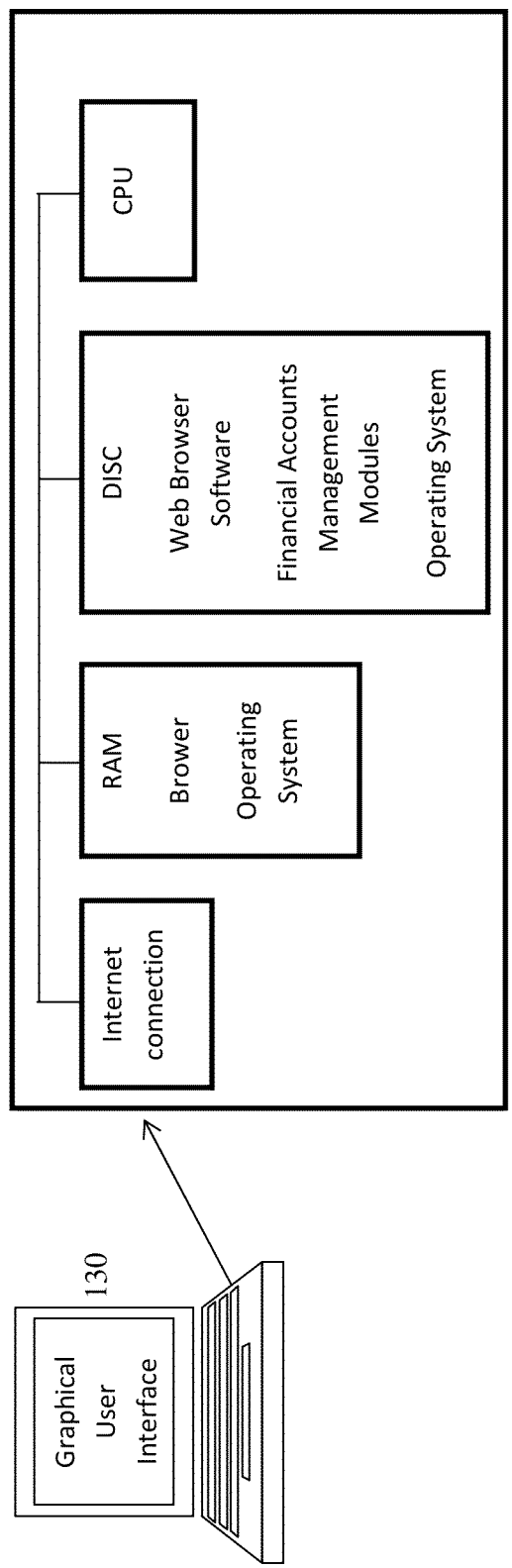
FIG. 2 is a detailed block diagram showing a configuration of the User's client computer (laptop or desktop) in a preferred embodiment of the present invention.
Figure 3:
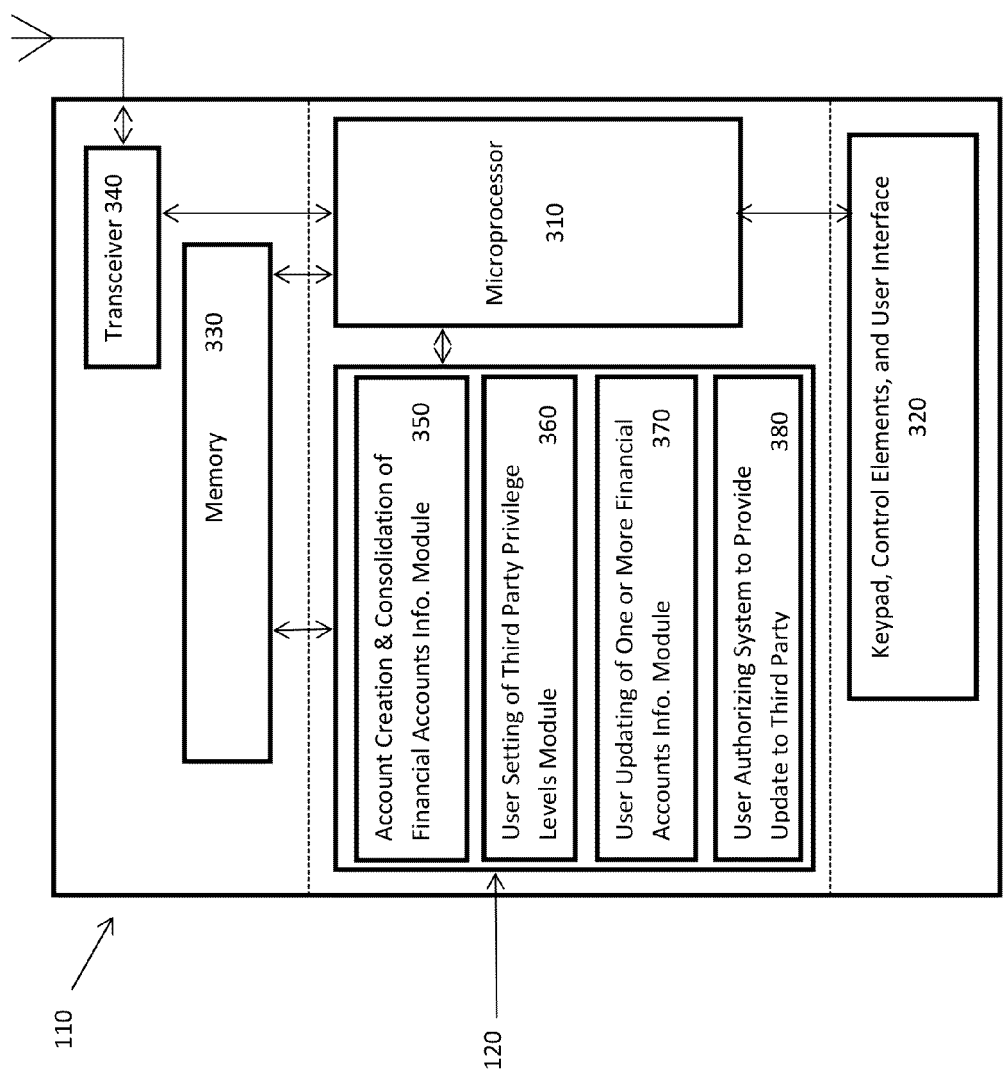
FIG. 3 shows a schematic diagram of a mobile device in accordance with one implementation of the present invention.

The embodiments described below and in the claims refer to a system server housing a database of Users' financial account information consolidated from a multitude of a User's digital accounts, wherein the system is in communication over a network with one or more User client computers (e.g. laptops and smartphones) as illustrated in FIGS. 1-3.

System Architecture

The present invention comprises a client computing system in communication via a network with a server system housing a database of Users' financial account information consolidated from their various financial accounts into a central file. In a preferred embodiment of the present invention, the software computer program runs on the System server and is accessed through the client computer's web browser. The financial account management features of the present invention may also be accessed through automated web services. And in situations wherein the client computing system is a mobile device with web browser capabilities (e.g. a smartphone), an application program provides full functionality of the present invention to run computer programming modules on the client device or on the system server. The application and the system software computer program comprise a computer readable medium containing computer executable instructions to carry out the methods of creating, accessing, and updating a User file in accordance with the present invention.

Software and Modules:

In the present invention, a "module" is herein defined as a portion of a computer program that carries out a specific function and may be used alone or combined with other modules of the same program. Likewise, "software" comprises program instruction adapted for execution by a hardware element, such as a processor, wherein the instruction comprise commands that when executed cause the processor to perform a corresponding set of commands. The software may be written or coded using a programming language, and stored using any type of computer-readable media or machine-readable media well known in the art. Examples of software in the present invention comprise any software components, programs, applications, computer programs, application programs, system programs, machine programs, and operating system software.

The Client System:

The system may comprise many Users, each with a client computer executing the application and capable of communicating with the server system. Herein the term "client" computer shall be used to represent any local computing device such as a smartphone, hand-held "palm top" computer, laptop computer, desktop computer, terminal, PDA (Personal Digital Assistant), PIM (Personal Information Manager), Network computer, wireless communicator (such as a cellular or satellite telephone), or a multi-User computing system, etc. which is capable of communicating with a remote or server computer via the remote network. The client computer may contain an output device such as a CRT or LCD screen or plasma display, a manual data entry device such as a keyboard, keypad, touch screen, voice recognition system, pen stylus, or other such manual input devices as are commonly known in the art. The client computer may comprise a mobile device running an application comprising the financial account management modules of the present invention.

A mobile device client computer has a secondary memory device, such as, for example, a hard disk drive or other nonvolatile memory. The client program of the system is stored on the secondary memory device of the client computer, such as a mobile device (e.g. smartphone) and is executed by the client computer's processor. It will be appreciated by one with skill in the art that the application might be installed on the client computer from a number of sources such as, for example, downloaded over the Internet from a server, or bundled with software provided by another software manufacturer (such as a Web browser provided by a Web browser manufacturer). It will be appreciated that the application will function in substantially the same manner regardless of the installation source or method.

The Server System:

As used herein the term "server" computer is used to describe any computing device that stores and runs a computer program of the present invention, houses the system database, and communicates periodically with the client program. The server system facilitates the collection and distribution of content to and from a multiplicity of client computers. The system server computer consists of one or multiple high speed CPU's (Central Processing Unit(s), primary memory (i.e. RAM) and secondary storage device(s) (i.e. hard disk drives). The application programs, operating system and the database management programs may all run on the same computing device as in a traditional "main frame" type of configuration or several, individual yet interconnected computing devices as in a traditional "multi-tier client-server" configuration as is well known in the art. The server system is coupled to the remote network (such as the Internet). The server system executes a (or multiple depending on the server system configuration) server program(s). The server system and the client program have communications facilities to allow client computers to connect to and communicate with the server program(s) such that the server program (s) can communicate with and exchange information with a multiplicity of client programs.

By way of exemplification, the system of the present invention as illustrated in FIG. 1 comprises the following components. A Network (Internet) 140 wherein the term "network" is used to describe any public network such as the Internet or World Wide Web or any public or private network as may be developed in the future which provides a similar service as the present Internet. The User's computing device may connect to the network via a variety of methods such as a phone modem, wireless (cellular, satellite, microwave, infrared, radio, etc.) network, Local Area Network (LAN), Wide Area Network (WAN), or any such means as necessary to communicate to a server computer connected directly or indirectly to the network (i.e. the Internet). A System server 155 comprising: a modem or other device for connecting to the computer network, a random access memory (RAM) for program execution, a hard disc for program storage, central processing unit (CPU), and a System database 160 of Users' financial account information. The System also comprises web server software, and financial account information management software of the present invention. A User computing device comprises an electronic communications device with web browser capabilities, such as a desktop, laptop, netbook, etc. . . . 130, and a mobile phone device (i.e. smartphone) 110. The User client computing device is configured to communicate with the System server via the Internet to enable Users to create and update their System record 170 comprising financial account information on the central database. The financial account information management modules may also be downloaded to the User's computing device to access and update the User's financial account information when the device is not connected to the Internet.

The User's computing device, such as a laptop, is further illustrated in FIG. 2. It comprises a central processing unit (CPU); a primary-random access memory (RAM) for program execution of web browser and the client operating system; a second storage device (hard disc) for program storage of local data (optional), web browser software, financial account information management software, and disc operating system; a User interface; and a modem or other device for connecting to the computer network.

As illustrated in FIG. 1, a User mobile device (e.g. smartphone) 110 is configured to communicate with the System database over a wireless communication network. A mobile computing device, such as a smartphone, may have voice and data communications capabilities. The device may also possess processing capabilities that allow the device to store and execute the financial account management modules 120 of the present invention.

As illustrated further in FIG. 3, the system architecture of an electronic communications device, (i.e. a mobile phone—smartphone) 110 suitable for the present invention is well known in the art, and comprises: a micro-processor 310; a User interface with data input keypad 320; memory 330 such as random access memory (RAM), read only memory (ROM), nonvolatile memory such as EPROM or EEROM, flash memory or hard drive memory; and a transceiver 340 functionally connected to an antenna to receive and transmit data in a wireless network. The transceiver may operate according to standards commonly known in the art by the skilled practitioner, such as for GSM, GPRS, wireless local and personal area network standards, and Bluetooth.

Mobile Application

The mobile device of the present invention may further comprise a native application, a web application, or a widget type application to carry out the methods of consolidating and updating financial account information, and granting Third Parties access to designated account information. A native application is installed on the device, wherein it is either pre-installed on the device or it is downloaded from the Internet. It may be written in a language to run on a variety of different types of devices; or it may be written in a device-specific computer programming language for a specific type of device. Contrarily, a web application resides on the system server and is accessed via the Internet. It performs basically all the same task as a native application, usually by downloading part of the application to the device for local processing each time it is used. The web application software is written as Web pages in HTML and CSS or other language serving the same purpose, with the interactive parts in Javascript or other language serving the same purpose. Or the application can comprise a widget as a packaged/downloadable/installable web application; making it more like a traditional application than a web application; but like a web application uses HTML/CSS/JavaScript and access to the Internet.

The mobile application may further comprise financial account management modules that interface with a wireless network to allow a User of a mobile device to create their System account, to update their financial information, and to grant permission or privilege levels to Third Parties for access to one or more of their financial accounts only for information sufficient to bill or credit the account. Financial account information management modules of the present invention may, for example, comprise: (1) an account creation module for Users to consolidate their various financial accounts information on the System database 350; (2) a module for Users to designate privilege levels to permit Third Parties access to a debiting/crediting information for one or more particular financial accounts 360 (i.e. for Companies with automatic debiting to access to User's stored financial account information specific to the debiting information on file with the Company); and (3) a module for Users to update one or more financial account information within the file on the System database 370; and (4) a module for permitting a User to authorize the System to provide the update to the appropriate Third Party if it pertains to a change in the Third Party's ability to bill or credit the User's financial account 380.

User Account Setup

Figure 4:
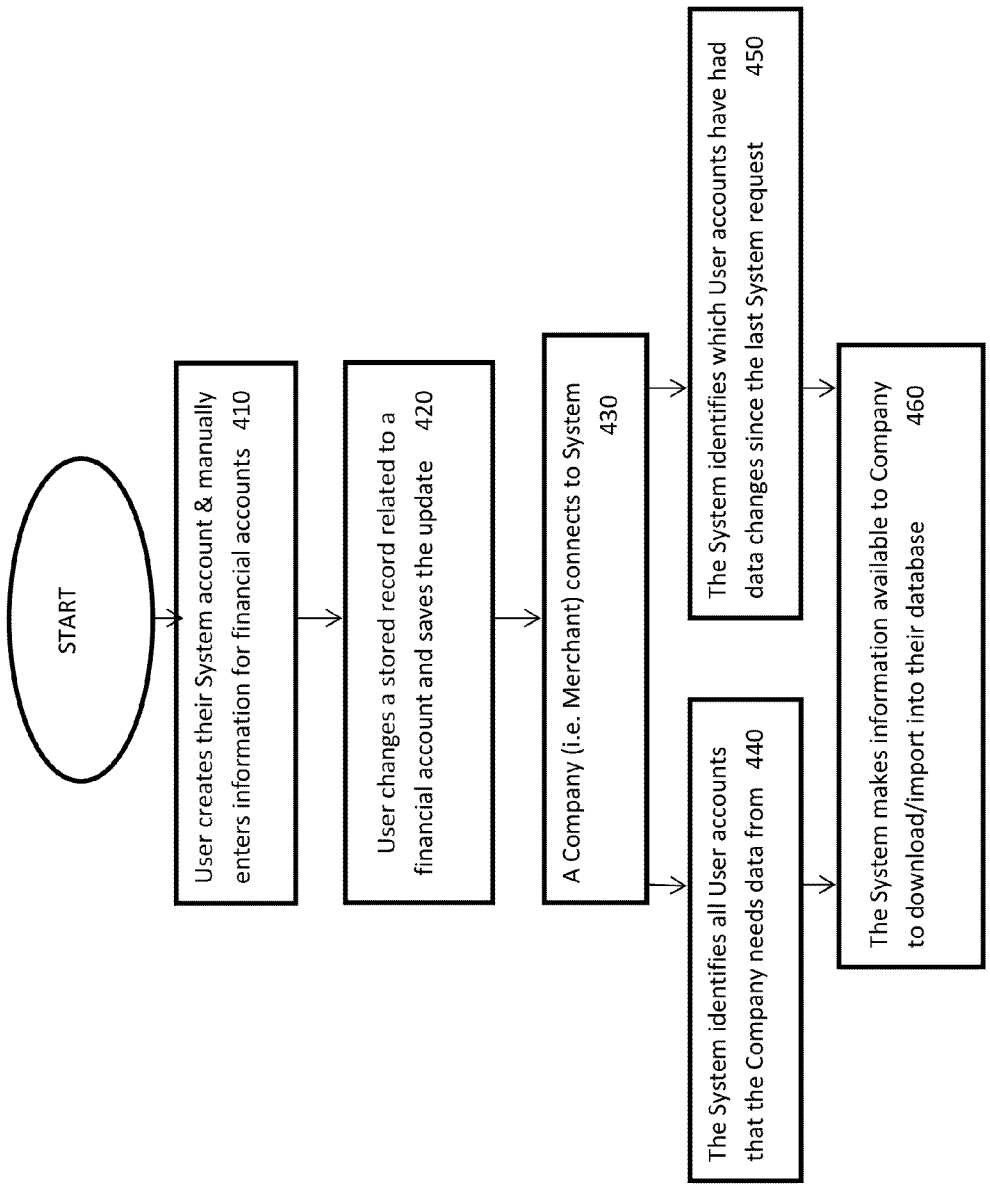
FIG. 4 illustrates a flowchart for a User to create a consolidated financial account file on the System, and permit a Third Party to access the System to receive file updates.

The methods and system of the present invention comprise the User creating an account on the System server. As illustrated in FIG. 4, the User creates an account 410 by, for example, registering at the system website and selecting a Username and password. They then manually enter their individual financial account information sufficient to electronically debit or credit the account, comprising: financial institution name; name on account; routing number (if applicable); account number; account type (i.e. checking, savings, retirement, credit card, etc.); expiration date; credit card security code (CSC); and account mailing address, phone number, email address; etc. The User or System also sets privilege levels by designating each Third Party having access to the information for each financial account within a User's file, and data elements within each account. At any time in the future, the User may change a stored record, data element, or delete or add a financial account information, and save the update 420.

Third Party Accesses System for Updates

In one preferred embodiment of the present invention, a Third Party, such as a merchant with periodic automated debiting (i.e. Netflix®), connects to the System after being granted permission by the System 430. Methods for a Third Party to access the System of another entity are well known in the art. For example, the Third Party may connect via an unsecured connection over the public internet (e.g. web service over http), or via a secured connection over the public internet (e.g. web service over https). Or, the Third Party may connect via a secured network connection (e.g. web service over VPN). Or, the host machine of the Third Party may be pre-authenticated via their IP address for access to the System (i.e. firewall rules allow access for the Third Party IP address to the System). Once the Third Party connects to the System, it must identify itself to the System, for example, using a username or other token (e.g. "Gold's Gym Inc."). And after the Third Party identifies itself, the System must authenticate the Third Party System by, for example, verifying the Third Party System password, or by back-and-forth challenge/response authentication.

The System then identifies all User records on the System database that the Third Party has an automated debiting/crediting agreement with (FIG. 4, 440). This may be accomplished, for example, by the System using the Third Party System's account information (e.g. "Gold's Gym Inc.") to identify which Users in the System have granted information access to Third Party System.

And/or the System then performs periodic requests to check for User updates that have occurred since the last System check. In particular, the System must identify updates that would affect the ability of a Third Party to electronically debit or credit the User's account (FIG. 4, 450). The System checks internal data to identify when the Third Party System last connected and downloaded data for all Users that is should have access to. The System then checks Users' data to determine whose data has been updated or modified since the last time the Third Party System connected. Alternatively, the Third Party System provides the System with a date/time value (i.e. timestamp). The System then identifies all records that the Third Party System should have access to that have been updated or modified since that date/time value.

For both steps 440 or 450, the System makes the information available to the Third Party via download to the Third Party's database 460. After the required data is compiled and is ready for download, the System formats the data in a proprietary format or in a format that is commonly accepted and used in the industry (e.g. XML, CSV, fixed-width, etc.). Then when the data is ready for download, the Third Party System will be able to retrieve the data using available communication protocols (e.g. web services or FTP).

System Accesses Third Party for Updates

Figure 5:
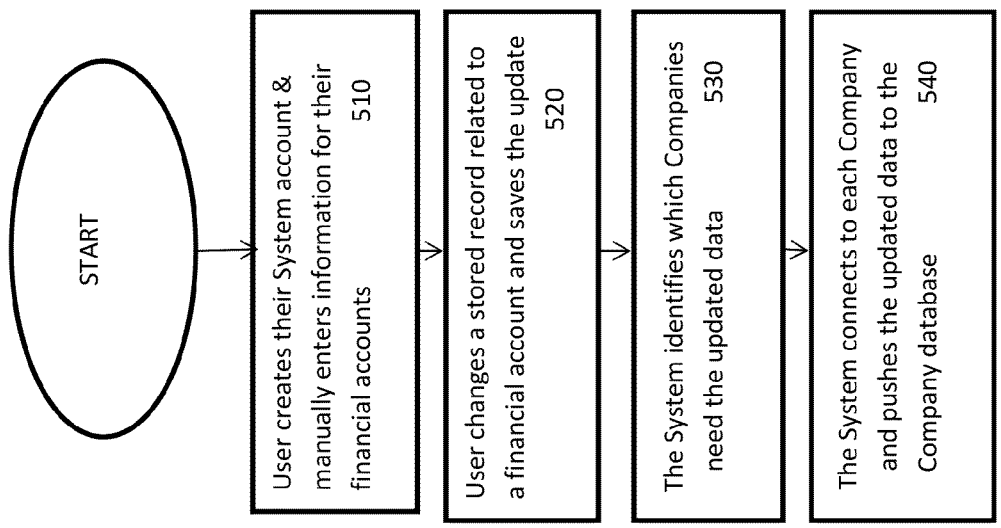
FIG. 5 illustrates a flowchart for a User to create a consolidated financial account file on the System, and to permit the System to access the Third Party's system to push file updates.

In addition to, or alternative to allowing the Third Party access to the System, the System can push User updates to the Third Party. As illustrated in FIG. 5, The User creates their System account and manually enters information for each of their financial accounts 510. As before, they then manually enter their individual financial account information comprising: financial institution name; name on account; routing number (if applicable); account number; account type (i.e. checking, savings, retirement, credit card, etc.); expiration date; credit card security code (CSC); and account mailing address, phone number, email address; etc. The User or System also sets privilege levels by designating each Third Party having access to the information for each financial account within a User's file, and data elements within each account. At any time in the future, the User may change a stored record, data element, or delete or add information for a financial account, and save the update 520.

The System will then identify which Third Parties need the User's updated data 530. This may be done on a periodic basis, or immediately after the User makes the record change. This may be accomplished, for example, by the System using the Third Party System's account information (e.g. "Gold's Gym Inc.") to identify which Users in the System have granted permission for the System to provide their account information to the Third Party.

The System then connects to each Third Party's database, after being granted access by the Third Party, and pushes the updated data to the Party's database 540. The System identifies that it should connect to the Third Party System; wherein it then connects using pre-arranged protocols (e.g. web service or FTP). The System then identifies and authenticates itself to the Third Party System, and submits data to the Third Party System in a pre-arranged format.

EXEMPLICATIONS

Example 1

Direct Deposit of Paycheck to a New Bank Account

A System User sets up a new bank account in the System, with: 1) the same financial institution, wherein they are changing only the account number; or 2) with a new financial institution, wherein they are changing the financial institution name, routing number, and account number stored in their System record. The System detects the bank account change and identifies which Third Parties will be affected by the change (i.e. will not be able to continue to credit or deposit the User's financial account due to the change). Information pertaining to the bank account change is subsequently made to the Third Party's database record for the User by either: 1) the Third Party accessing the System database; or 2) the System accessing the Third Party database. As a result of updating the Third Party database, direct deposits (payroll, tax refunds, alimony/child support payments, Social Security deposits, etc. . . . ) can immediately go to the new account without the User having to notify each depositor; and automatic debits (car payments, mortgage payments, insurance payments, etc.) can be made against the new account uninterrupted.

Example 2

Automatic Debiting with New Credit Card

A System User wishes to change the credit card that a Third Party automatically debits from, such as a gym membership. The User changes on the System the privilege level or the Third Party authorized access to this credit card debiting information. Information pertaining to the new credit card is subsequently made to the Third Party's database record for the User by either: 1) the Third Party accessing the System database; or 2) the System accessing the Third Party database, so that the membership fees are successfully debited against the new credit card in the Third Party's next debiting cycle.

Example 3

Automatic Debiting of Online Account

A System User wishes to change their debiting information saved on one of their online accounts, such as the credit card information associated with their Amazon® account. Instead of logging into the Amazon® website and manually entering their new debiting information, they make the change in their account on the System database, wherein the User removes Amazon's access for the debiting information from one credit card, and grants Amazon access to the debiting information for another credit card. Information pertaining to the new credit card is subsequently made to the Amazon's database record for the User by either: 1) the Amazon system accessing the System database; or 2) the System accessing Amazon's debiting database. The next time the User makes a purchase on the Amazon® website using, for example the "1-click" method, the new credit card will be debited.

Example 4

Automatic Deduction to a Retirement Account

A System User wishes to change the retirement account that their employer or that they make automatic contributions to, such as from their paycheck. The User makes the change in the retirement account information on the System database, so that automatic contributions will be made against the new account. Information pertaining to the new retirement account is subsequently made to the employer's database, or to the databases of the financial institutions who deduct funds from a User's bank account to make a contribution to the User's retirement account. For example, the System will electronically notify the financial institution holding the User's old retirement account, and the financial institution holding the User's new retirement account of the change, such that the update is made automatically. Then the next time the User receives a paycheck or makes an automated contribution from one of their bank accounts, the new retirement account will be correctly credited with the contribution.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A computer implemented method for Users to consolidate and update Users' financial account information on a networked System database comprising electronic debiting and crediting information for one or more of a User's financial account(s), and then automatically updating the User's information on a Third Party's database, comprising:
   a) Users consolidating and updating Users' financial account(s) information in a System database;
   b) connecting to the System by Third Party Systems, wherein said Third Party Systems are authorized to electronically deduct or credit one or more of said Users' account(s);
   c) granting by the System only the Users' account(s) information said Third Party Systems are authorized to receive;
   d) making previously identified data available by the System for download by Third Party Systems, wherein said data comprises account information a Third Party needs for electronically deducting or crediting a User's account; and,
   e) wherein financial accounts comprise bank accounts, credit card accounts, debit card accounts, retirement accounts, investment accounts, PayPal® accounts and other similar financial accounts.

2. The method of claim 1, wherein said granting further comprises the Third Party Systems providing the System a list of Users' accounts for which data is requested.

3. The method of claim 1, wherein said granting further comprises the System identifying updated and new Users' accounts to provide the Third Party Systems.

4. The method of claim 1 further comprises the Users entering and updating Third Party access permissions for each of a User's financial account(s) stored on the System database.

5. A non-transitory computer readable medium containing computer executable instructions to carry out the method of claim 1 wherein said instructions are downloadable from or stored on a system server.

6. A computer implemented method for Users to consolidate and update Users' financial account information on a networked System database comprising electronic debiting and crediting information for one or more of a User's financial account(s), and then automatically updating the User's information on a Third Parties' database, comprising:
   a) Users consolidating and updating Users' financial account(s) information in a System database;
   b) identifying by the System the Third Party Systems authorized to electronically deduct or credit from each of Users' financial account(s);
   c) identifying by the System new User and updated User financial account(s) information to provide the Third Party Systems;
   d) connecting by the System to the Third Party Systems and downloading the updates to the Third Party databases; and,
   e) wherein financial accounts comprise bank accounts, credit card accounts, debit card accounts, retirement accounts, investment accounts, PayPal® accounts and other similar financial accounts.

7. The method of claim 6 further comprises the Users entering and updating Third Party access permissions for each of a User's financial account(s) stored on the System database.

8. A non-transitory computer readable medium containing computer executable instructions to carry out the method of claim 6 wherein said instructions are downloadable from or stored on a system server.

9. A networked financial account management system for a User to consolidate and update a User's financial account information and to automatically update the User's information on a Third Party's database, comprising:
- a) a server System comprising:
  - a central database storing a record for each User's consolidated financial account(s) information and designated privilege levels for sharing said information with a Third Party System, wherein said Party is authorized to electronically deduct or credit said account(s);
  - a financial account information manager software on said database providing access to Third Party Systems authorized to receive said User's financial account(s) information through a computer interface;
- b) one or more client systems comprising a user interface with web browsing capabilities and configured to communicate with the System server via the Internet to enable a User to create and update the User's financial account(s) information on said database; and,
- c) wherein the financial account information comprises information pertaining to a User's bank accounts, credit card accounts, debit card accounts, retirement accounts, investment accounts, PayPal® accounts and other similar financial accounts.

10. The system of claim 9, wherein designating privilege levels comprises Users designating each Third Party System authorized access to financial account(s) information within a User's record.

11. The system of claim 9, wherein said client system is a mobile communications device with web browser capabilities, and further comprising financial account information management modules enabling Users to create, access, and update their financial account information on said system server.

12. The system of claim 11, wherein said financial account information management modules on said mobile communications device provide functionality for:
- a) a User to consolidate their online financial accounts into a file stored within the database of the mobile device memory;
- b) a User to designate privilege levels to permit Third Parties access to each stored financial account information;
- c) a User to automatically update their financial account information in said database; and,
- d) a User to authorize the System to provide said updates to designated Third Party Systems.

13. The system of claim 12, wherein the financial account information on the mobile communications device and in the System server are periodically synched with the central database to save said updates in the System database.

14. A non-transitory computer-readable medium having at least computer-executable program code tangibly embodied therein for updating an online record comprising one or more of a User's financial account(s) information on a System database over a network, comprising:
- a) computer program code for creating a User file, inputting said User's financial account information for one or more accounts, and transmitting said information to User's record stored on the System database;
- b) computer program code for designating the Third Party Systems permitted access to each financial account within said User's file;
- c) computer program code for-inputting an update to a data element in User's financial account information; and transmitting said update to User's record stored on the System database; and,
- d) wherein the financial account information comprises information pertaining to a User's bank accounts, credit card accounts, debit card accounts, retirement accounts, investment accounts, PayPal® accounts and other similar financial accounts.

15. The non-transitory computer readable medium of claim 14 further comprising, computer program code on a System server for permitting said Third Party Systems to connect to said System server, wherein said System makes said information available to said Third Party to download.

16. The non-transitory computer readable medium of claim 15, wherein said information is derived from the System identifying all Users' accounts the Third Party Systems need data from.

17. The non-transitory computer readable medium of claim 15, wherein said information is derived from the System identifying which Users' accounts have had data changes since the last System request.

18. The non-transitory computer readable medium of claim 14 further comprising, computer program code on a System server for permitting the System to connect to the Third Party servers, wherein said System downloads said Users' account information.

* * * * *